United States Patent
Ligtenberg

(10) Patent No.: US 7,660,104 B2
(45) Date of Patent: Feb. 9, 2010

(54) USER INTERFACE COMPONENT WITH A REMOVABLE COVER

(75) Inventor: Chris Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 12/034,174

(22) Filed: Feb. 20, 2008

(65) Prior Publication Data
US 2009/0231792 A1 Sep. 17, 2009

(51) Int. Cl.
*G06F 1/16* (2006.01)
(52) U.S. Cl. ............... 361/679.08; 200/302.2; 345/173; 400/490; 710/316
(58) Field of Classification Search ........... 200/302.2, 200/600, 5 A, 315, 517; 345/156, 169, 173; 400/472, 490, 479, 489; 361/679.09, 679.15, 361/679.08, 679.23, 679.13, 679.03, 679.52; 710/18, 316
See application file for complete search history.

(56) References Cited

U.S. PATENT DOCUMENTS
| | | | |
|---|---|---|---|
| 6,435,763 B1 * | 8/2002 | Sakane et al. | 404/25 |
| 2008/0266782 A1 * | 10/2008 | Zhang | 361/686 |
| 2009/0079593 A1 * | 3/2009 | Yamakawa et al. | 341/22 |

\* cited by examiner

*Primary Examiner*—Hung V Duong
(74) *Attorney, Agent, or Firm*—IP Strategy Group, P.C.

(57) ABSTRACT

A user interface component for use in an electronic device is disclosed. The electronic device includes a first part and a second part. The user interface component may include a structural part configured to provide structural stiffness for the user interface component. The structural part may include an aperture. The aperture may allow a fastener to pass through the structural part to couple the first part with the second part without removing the structural part from the electronic device. The aperture may also allow the fastener to be removed from the electronic device through the structural part without removing the structural part from the electronic device. The user interface component may also include a cover detachably coupled with the structural part. The cover may cover the aperture and may receive user input.

20 Claims, 5 Drawing Sheets

USER INTERFACE COMPONENT WITH A REMOVABLE COVER

BACKGROUND OF THE INVENTION

Enclosures of electronic devices typically include multiple parts that may need to be coupled by fasteners, such as screws. If the fasteners are readily visible and accessible, the electronic devices may be more likely to be disassembled and/or tampered with by users. On the other hand, if the fasteners are not easily accessible, additional time and/or cost may be required for removing the fasteners when legitimate services are to be performed on the electronic devices, e.g., by technicians of the manufacturers of the electronic devices.

For example, FIG. 1A illustrates a schematic representation of an example prior art electronic device 100. An enclosure of electronic device 100 may include a top case 101 and a bottom case 102. Top case 101 and bottom case 102 may be mechanically coupled by screws 103 and 104.

As illustrated in the example of FIG. 1A, screws 103 and 104 may be readily visible and accessible to a user of electronic device 100. As a result, the user may be more tempted to disassemble electronic device 100 due to curiosity or in an attempt to perform unauthorized repairs, and the components contained inside top case 101 and bottom case 102 may be tampered with by the user. Consequently, electronic device 100 may be damaged.

Exterior components of electronic device 100 may not be designed to effectively conceal screws (e.g., screws 103 and 104) such that the screws are not visible to the user while being easily accessible by service technicians. As an example of the exterior components, a space bar 110 of electronic device is discussed, with reference to the example of FIG. 1B.

FIG. 1B illustrates a schematic representation of a cross-sectional view A-A of space bar 110 indicated in the example of FIG. 1A. As illustrated in the example of FIG. 1B, space bar 110 may include a keycap 190. Space bar 110 may also include one or more scissor-arm mechanisms, such as scissor-arm mechanism 115, and one or more levelers, such as levelers 116 and 126, configured to mechanically couple keycap 100 to a keyboard mechanism plate 111 through one or more pin-and-slot mechanisms, such as pin-and-slot mechanism 121 and 122. Scissor-arm mechanism 115 and levelers 116 and 126 may also be configured to keep keycap 190 substantially parallel to keyboard mechanism plate 111 when keycap 190 is pressed by a user.

When keycap 190 is pressed by the user, keycap 190 may compress tactile dome 114 such that a loading portion 113 of tactile dome 114 may urge a membrane 117 to contact a membrane 118. When membrane 117 is in contact with membrane 118, an electrical signal may be generated.

Space bar 110 may also include stiffener 161 disposed under key cap 190. Stiffener 161 may be configured to provide structural stiffness for key cap 190.

As illustrated in the example of FIG. 1B, keycap 190 may not be easily removed from mechanism plate 115 (or electronic device 100). In particular, keycap 190 may not be easily removed without one or more of keycap 190, scissor-arm mechanism 115, levelers 116 and 126, pin-and-slot mechanism 121 and 122, and other components inside space bar 110 being damaged. Even if undamaged, the complexity of the design is such that the components associated with the keycap are often difficult to disassemble and reassemble without requiring specialized tools and/or specialized knowledge.

Concealing screws under space bar 110 may prevent users from disassembling and tampering with electronic device 100. However, a significant amount of cost for replacing damaged parts may be incurred and/or a substantial disassembling time may be required when electronic device 100 is to be serviced by a technician. Accordingly, as illustrated by space bar 110 of electronic device 100 in the example of FIGS. 1A-B, concealing screws under exterior components may be impractical for prior art electronic devices.

SUMMARY OF INVENTION

An embodiment of the present invention relates to a user interface component for use in an electronic device. The electronic device includes a first part and a second part. The user interface component may include a structural part configured to provide structural stiffness for the user interface component. The structural part may include an aperture. The aperture may allow a fastener to pass through the structural part to couple the first part with the second part without removing the structural part from the electronic device. The aperture may also allow the fastener to be removed from the electronic device through the structural part without removing the structural part from the electronic device. The user interface component may also include a cover detachably coupled with the structural part. The cover may cover the aperture and may receive user input.

The above summary relates to only one of the many embodiments of the invention disclosed herein and is not intended to limit the scope of the invention, which is set forth is the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1A:
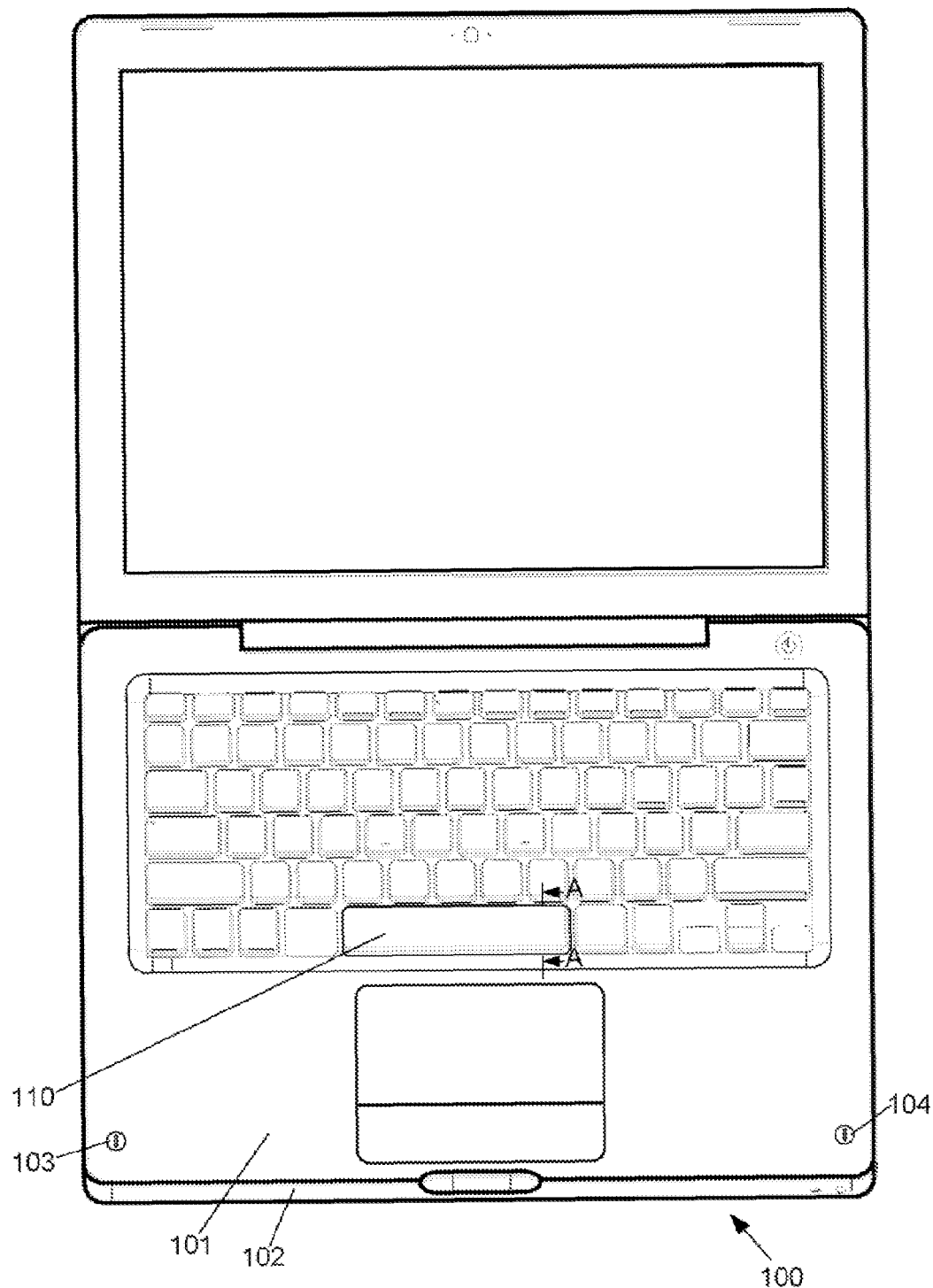
FIG. 1A illustrates a schematic representation of an example prior art electronic device.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

One or more embodiments of the invention relate to a user interface component configured for use in an electronic device. The user interface component may represent a keycap of a key of a key set, e.g., a keyboard or a keypad. For example, the user interface component may represent a keycap of a space bar of a keyboard. As another example, the user interface component may represent a pick button of the track pad subsystem. As another example, the user interface component may represent a track pad.

The electronic device may represent for example, one or more of a computing device (e.g., a computer), a communication device (e.g., a cellular phone), an entertainment device (e.g., a media player), etc. The electronic device may include a first part and a second part that need to be mechanically coupled.

In the following discussion, a key cap is employed as an example user interface component. However, it should be understood that the invention also applies to other human interface components such as pick buttons, track pads, etc.

Generally speaking, the key cap user interface component may include a structural part configured to provide structural stiffness for the user interface component. The structural part may also be configured to compress a tactile dome when the cover receives the user input, thereby triggering generation of a signal.

The structural part is coupled with a mechanism plate (e.g., a keyboard mechanism plate) of the electronic device by one or more stabilization mechanisms (e.g., one or more scissor-arm mechanisms and/or leveler bars). The one or more stabilization mechanisms may be configured to keep the user interface component substantially parallel to the mechanism plate when the cover receives the user input.

The structural part may include an aperture. The aperture may be configured to allow a fastener to pass through the structural part to couple the first part with the second part without removing the structural part from the electronic device. The aperture may be further configured to allow the fastener to be removed from the electronic device through the structural part without removing the structural part from the electronic device. The aperture may also be configured to allow an illumination unit disposed inside the electronic device to illuminate at least a portion of the cover.

In one or more embodiments, the aperture may be configured to allow a plurality of fasteners to pass through the structural part to couple the first part with the second part without removing the structural part from the electronic device. The aperture further may also be configured to allow the plurality of fasteners to be removed from the electronic device through the structural part without removing the structural part from the electronic device.

In one or more embodiments, the structural pail may include a plurality of apertures. Each of the plurality of the apertures may be configured to allow one or more fasteners to pass through the structural part to couple the first part with the second part and to be removed through the structural part without removing the structural part from the electronic device.

The user interface component may also include a cover. The cover may be removable (or detachable) from the structural part. The cover may be configured to cover the aperture. The cover may be configured to provide visual cues to provide the user with an indication of the function of the underlying user interface component (e.g., letter "K"). The cover may also be configured to receive user input. The cover may also be configured to compress a tactile dome when the cover receives the user input, thereby triggering generation of a signal.

The cover may also be configured to cover the structural part. The cover may be magnetically coupled with and/or snapped onto the structural part.

One or more embodiments of the invention relate to the electronic device that implements one or more of the above-mentioned user interface components.

The features and advantages of the present invention may be better understood with reference to the figures and discussions (with prior art mechanisms and embodiments of the invention contrasted) that follow.

Figure 2A:
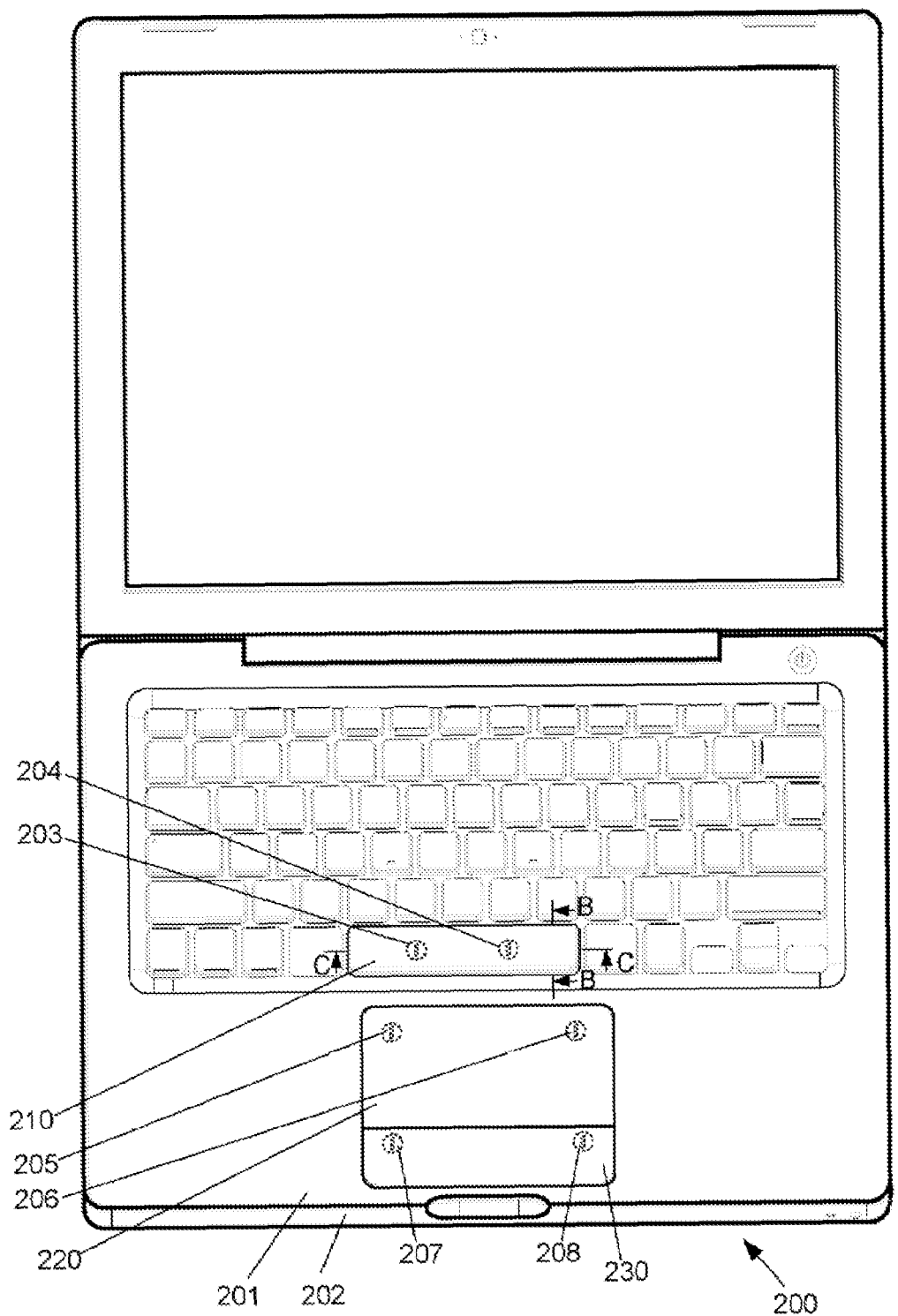
FIG. 2A illustrates a schematic representation of an electronic device in accordance with one or more embodiments of the present invention.

FIG. 2A illustrates a schematic representation of an electronic device 200 in accordance with one or more embodiments of the present invention. Electronic device 200 may include a top case 201 (representing a first part) and a bottom case 202 (representing a second part).

Top case 201 and bottom case 202 may be mechanically coupled by one or more of fasteners 203-208. For example, top case 201 and bottom case 202 may be mechanically coupled by one or more of fasteners 203-204 concealed under a space bar 210. Alternatively or additionally, top case 201 and bottom case 202 may be mechanically coupled by one or more of fasteners 205-206 concealed under a track pad 220. Alternatively or additionally, top case 201 and bottom case 202 may be mechanically coupled by one or more of fasteners 207-208 concealed under a pick button 230.

One or more of space bar 210, track pad 220, and pick button 230 may include a structural part that have one or more apertures configured to allow one or more fasteners to pass through. Further, one or more of space bar 210, track pad 220, and pick button 230 may include a cosmetic cover configured to cover the one or more apertures. As an example, space bar 210 is discussed with reference to FIGS. 2B-C.

Figure 2B:
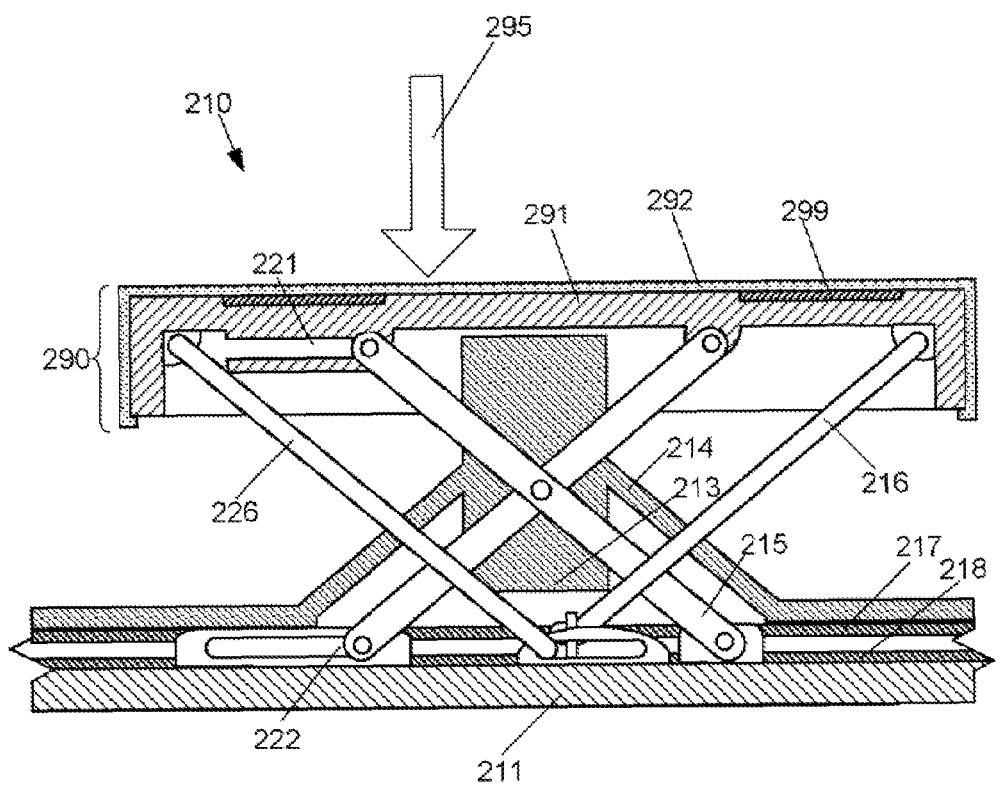
FIG. 2B illustrates a schematic representation of a cross-sectional view of a space bar indicated in the example of FIG. 2A in accordance with one or more embodiments of the present invention.

FIG. 2B illustrates a schematic representation of a cross-sectional view B-B of space bar 210 indicated in the example of FIG. 2A in accordance with one or more embodiments of the present, invention. As illustrated in the example of FIG. 2B, space bar 210 may include stabilization mechanisms (e.g., scissor-arm mechanism 215 and levelers 216 and 226) and/or pin-and-slot mechanisms (e.g., pin-and-slot mechanisms 221 and 222) configured to mechanically couple a keycap 290 with a keyboard mechanism plate 211. The stabilization mechanisms and/or pin-and-slot mechanisms may also be configured to keep keycap 290 substantially parallel to keyboard mechanism plate 211 when keycap 290 receives user input 295, e.g., a compression force.

Figure 1B:
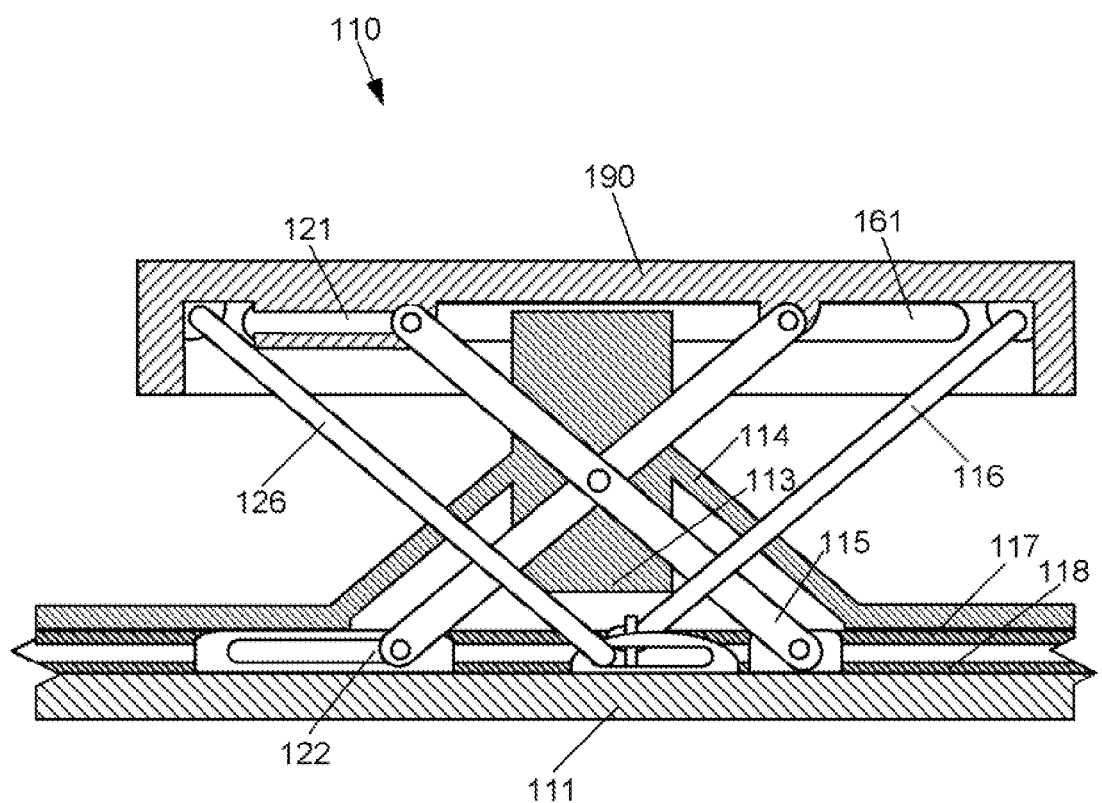
FIG. 1B illustrates a schematic representation of a cross-sectional view of a space bar indicated in the example of FIG. 1A.

Keycap 290 may include a structural part 291 configured to provide structural stiffness for keycap 290. For example, structural part 291 may be made of a material including one or more of glass-filled high performance plastic, cast metal, aluminum, titanium, and stainless steel. Accordingly, keycap 290 may not need an additional stiffener like stiffener 161 of space bar 110 illustrated in the example of FIG. 1B. Structural part 291 may be mechanically coupled with one or more of the stabilization mechanisms (e.g., scissor-arm mechanisms and levelers) through one or more of the pin-and-slot mechanisms.

Keycap 290 may also include a cover 292 attached to structural part 291. Cover 292 may be configured to receive user input 295. Cover 292 may also be configured to provide a cosmetic appearance and a tactile feel of keycap 290. A user may have several covers with different appearances, colors, and/or feels, and may change the covers in place of cover 292 from time to time, for example, for personalization and/or for fun.

Cover 292 may be easily removable or detachable from structural part 291. For example, cover 292 may be snapped onto structural part 291. Alternatively or additionally, cover 292 may be magnetically coupled with structural part 291 by one or more magnetic and/or ferrous elements, such as magnetic element 299. In one or more embodiments, cover 292 may represent a sticky label.

Space bar 210 may also include tactile dome 214 (with a loading portion 213), membrane 217, and membrane 218 configured for triggering generation of signals.

Figure 2C:
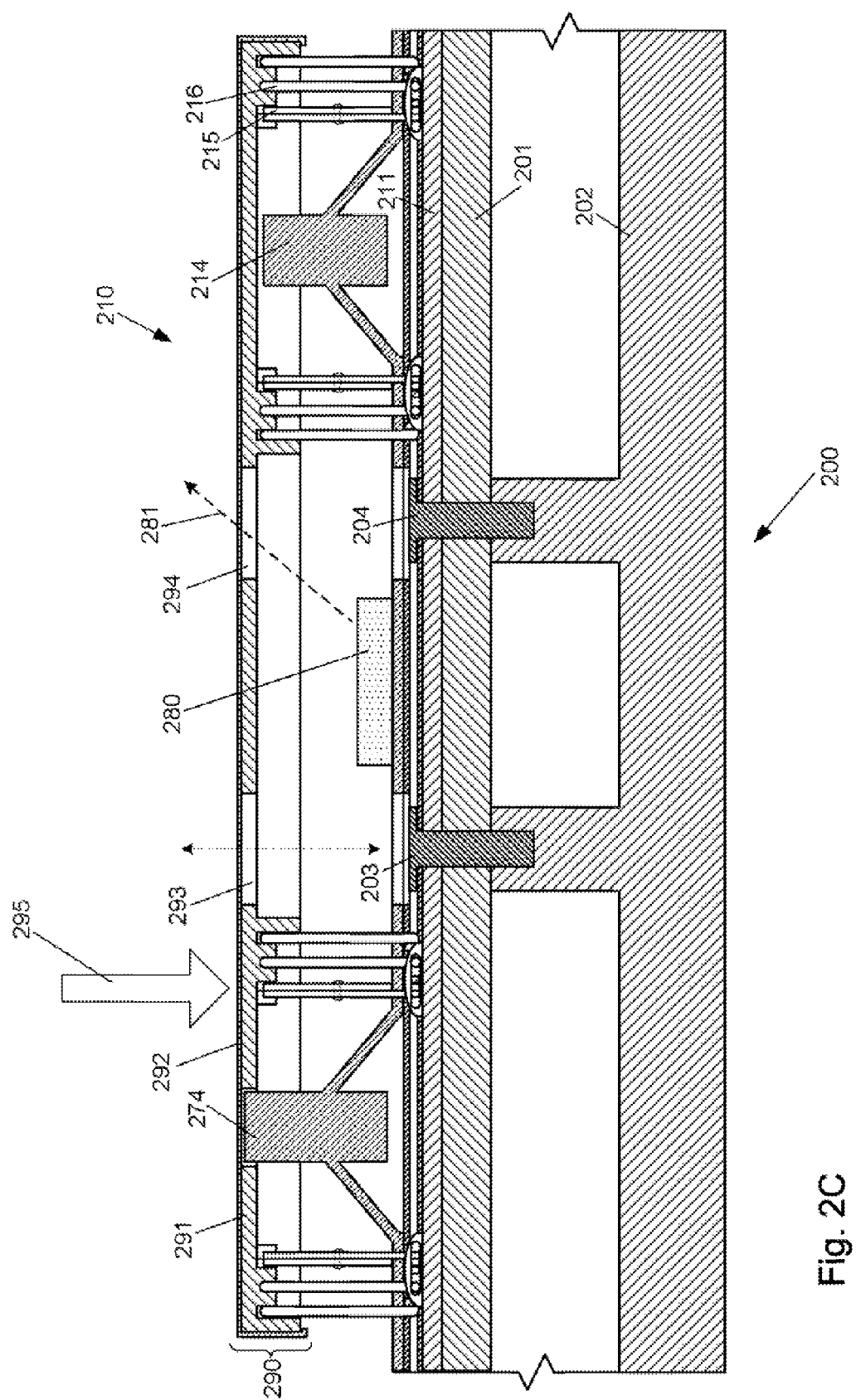
FIG. 2C illustrates a schematic representation of another cross-sectional view of the space bar indicated in the example of FIG. 2A in accordance with one or more embodiments of the present invention.

FIG. 2C illustrates a schematic representation of a cross-sectional view C-C of space bar 210 indicated in the example of FIG. 2A in accordance with one or more embodiments of the present invention.

As illustrated in the example of FIG. 2C, structural part 291 (or key cap 290) may include one or more apertures, such as apertures 293 and 294. The apertures may be configured to allow fasteners, such as fasteners 203 and 204 (e.g., screws, frictional units, or snap-on units), to pass through structural part 291. Accordingly, without structural part 291 being decoupled from stabilization mechanisms (e.g., scissor-arm mechanism 215 and leveler 216) or removed from electronic device 200, fasteners 203 and 204 may be inserted through apertures 293 and 294 to mechanically couple top case 201 with bottom case 202. Cover 292 may simply need to be removed and replaced.

Further, without structural part 291 being decoupled from the stabilization mechanisms or removed from electronic device 200, fasteners 203 and 204 may be easily removed through apertures 293 and 294. Accordingly, top case 201 and bottom case 202 may be decoupled, and electronic device 200 may be disassembled. Cover 292 may simply need to be removed and replaced.

Apertures 293 and 204 may also be configured to allow an illumination unit 280 to provide illumination to at least a portion of cover 292 (e.g., for backlighting purposes). For example, aperture 294 may be configured to allow a light beam 281 from illumination unit 280 to at least partially pass through.

Cover 292 may be configured to cover structural part 291 for usability and aesthetic considerations. Cover 292 may be configured to cover the top surface of structural part 291, thereby covering the one or more apertures, such as apertures 293 and 294. In one or more embodiments, cover 292 may be configured to cover only the one or more apertures without covering the rest of structural part 291.

When cover 292 receives user input 295, cover 292 may compress tactile dome 274 for generating an electrical signal. Alternatively or additionally, when user input 295 is received, structural part 291 may compress tactile dome 214 for generating the electrical signal.

As can be appreciated from the foregoing, embodiments of the present invention may separate cosmetic functions and structural functions for exterior components (e.g., user interlace components) of electronic devices. Accordingly, embodiments of the invention may advantageously provide manufacturability and flexibility in manufacturing and servicing electronic devices.

Embodiments of the present invention may also effectively conceal fasteners from users of electronic devices. Advantageously, inappropriate handling or tampering of the electronic devices may be prevented. Embodiments of the invention may also provide convenience for service technicians to remove the fasteners for service purposes.

Providing easily detachable covers, embodiments of the invention may also provide convenience, flexibility, and versatility in changing the appearance and tactile feel of exterior components of electronic devices. Accordingly, there may be more personalization and more fun associated with utilizing the electronic devices.

While ibis invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A user interface component configured for use in an electronic device, the electronic device including at least a first part and a second part; the user interface component comprising:

a structural part configured to provide structural stiffness for the user interface component, the structural part including at least an aperture, the aperture configured to allow a fastener to pass through the structural part to couple the first part with the second part without removing the structural part from the electronic device, the aperture further configured to allow the fastener to be removed from the electronic device through the structural part without removing the structural part from the electronic device; and a cover detachably coupled with the structural part, the cover configured to cover the aperture, the cover further configured to receive user input.

2. The user interface component of claim 1 representing a keycap of a key of a key set.

3. The user interface component of claim 1 representing a keycap of a space bar of a keyboard.

4. The user interface component of claim 1 representing a pick button.

5. The user interface component of claim 1 representing a track pad.

6. The user interface component of claim 1 wherein the cover is further configured to cover the structural part.

7. The user interface component of claim 1 wherein the cover is magnetically coupled with the structural part.

8. The user interface component of claim 1 wherein the cover is further configured to compress a tactile dome when the cover receives the user input, thereby triggering generation of a signal.

9. The user interface component of claim 1 wherein the structural part is further configured to compress a tactile dome when the cover receives the user input, thereby triggering generation of a signal.

10. The user interface component of claim 1 wherein the structural part is coupled with a mechanism plate of the electronic device by one or more stabilization mechanisms, the one or more stabilization mechanisms configured to keep the user interface component substantially parallel to the mechanism plate when the cover receives the user input.

11. The user interface component of claim 1 wherein the structural part is coupled with a mechanism plate of the electronic device by one or more leveler bars, the one or more leveler bars configured to keep the user interface component substantially parallel to the mechanism plate when the cover receives the user input.

12. The user interface component of claim 1 wherein the aperture is configured to allow a plurality of fasteners to pass through the structural part to couple the first part with the second part without removing the structural part from the electronic device, the aperture further configured to allow the plurality of fasteners to be removed from the electronic device through the structural part without removing the structural part from the electronic device.

13. The user interface component of claim 1 wherein the structural part includes a plurality of apertures, each of the plurality of the apertures is configured to allow one or more fasteners to pass through the structural part to couple the first part with the second part and to be removed through the structural part without removing the structural part from the electronic device.

14. The user interface component of claim 1 wherein the aperture is further configured to allow an illumination unit disposed inside the electronic device to illuminate at least a portion of the cover.

15. An electronic device comprising:
a first part;
a second part configured to be coupled with the first part by at least a fastener;
a user interface component including at least a structural part configured to provide structural stiffness for the user interface and having an aperture allowing the fastener to pass through,
wherein the aperture is configured to allow the fastener to pass through the structural part to couple the first part with the second part without removing the structural part from the electronic device,
the aperture is further configured to allow the fastener to be removed from the electronic device through the structural part without removing the structural part from the electronic device.

16. The electronic device of claim 15 wherein the user interface component represents at least one of a keycap of a key of a key set, a keycap of a space bar of a keyboard, a pick button, and a track pad.

17. The electronic device of claim 15 wherein the user interface component further includes a cover detachably coupled with the structure part, the cover being configured to compress a tactile dome when the cover receives a user input, thereby triggering generation of a signal.

18. The electronic device of claim 15 wherein the structural part is coupled with a mechanism plate of the electronic device by one or more stabilizing mechanisms, the one or more stabilizing mechanisms configured to keep the user interface component substantially parallel to the mechanism plate when the cover receives the user input.

19. The electronic device of claim 15 wherein the aperture is configured to allow a plurality of fasteners to pass through the structural part to couple the first part with the second part without removing the structural part from the electronic device, the aperture further configured to allow the plurality of fasteners to be removed from the electronic device through the structural part without removing the structural part from the electronic device.

20. The electronic device of claim 15 wherein the aperture is further configured to allow an illumination unit disposed inside the electronic device to illuminate at least a portion of the cover.

* * * * *

UNITED STATES PATENT AND TRADEMARK OFFICE
CERTIFICATE OF CORRECTION

PATENT NO.           : 7,660,104 B2                                  Page 1 of 1
APPLICATION NO.      : 12/034174
DATED                : February 9, 2010
INVENTOR(S)          : Chris Ligtenberg It is certified that error appears in the above-identified patent and that said Letters Patent is hereby corrected as shown below:

In column 1, line 33, delete "discussed," and insert -- discussed --, therefor.

In column 1, line 41, delete "100" and insert -- 190 --, therefor.

In column 1, line 52, after "include" insert -- a --.

In column 1, line 56, delete "115" and insert -- 111 --, therefor.

In column 3, line 51, delete "pail" and insert -- part --, therefor.

In column 4, line 36, delete "present," and insert -- present --, therefor.

In column 5, lines 51-52, delete "interlace" and insert -- interface --, therefor.

In column 6, line 1, delete "ibis" and insert -- this --, therefor.

In column 6, line 18, in Claim 1, delete "part;" and insert -- part, --, therefor.

Signed and Sealed this
Twenty-second Day of November, 2011

David J. Kappos
*Director of the United States Patent and Trademark Office*